United States Patent [19]

Thyfault

[11] Patent Number: 4,735,807

[45] Date of Patent: * Apr. 5, 1988

[54] METHOD OF MAKING CEREAL WINE

[76] Inventor: Ronald Thyfault, Damar, Kans. 67632

[*] Notice: The portion of the term of this patent subsequent to Jun. 23, 2004 has been disclaimed.

[21] Appl. No.: 927,494

[22] Filed: Nov. 6, 1986

Related U.S. Application Data

[63] Continuation-in-part of Ser. No. 808,547, Dec. 13, 1985, Pat. No. 4,675,192.

[51] Int. Cl.⁴ .......................... C12G 1/00; C12G 1/08
[52] U.S. Cl. .......................... 426/12; 426/29; 426/592
[58] Field of Search .................. 426/11, 12, 14, 15, 426/18–21, 592, 49–51, 52, 27, 28, 29

[56] References Cited

U.S. PATENT DOCUMENTS

| | | |
|---|---|---|
| 410,872 | 9/1889 | Boefer . |
| 412,385 | 10/1889 | Hamlin . |
| 757,352 | 4/1904 | Sanguineti . |
| 825,342 | 7/1906 | Palmer . |
| 1,349,000 | 8/1920 | Kellogg . |
| 3,236,740 | 2/1966 | Smith et al. . |
| 3,576,645 | 4/1971 | Rozsa ........................ 99/31 |
| 3,652,295 | 3/1972 | Rogols ........................ 99/91 |
| 4,035,515 | 7/1977 | Cunningham .................. 426/14 |
| 4,081,557 | 3/1978 | Azoulay ...................... 426/18 |
| 4,092,434 | 5/1978 | Yoshizumi et al. ............ 426/13 |
| 4,329,433 | 5/1982 | Seebeck ..................... 435/255 |
| 4,343,231 | 8/1982 | Devreux ................... 99/277.2 |
| 4,514,496 | 4/1985 | Yoshizumi et al. .......... 435/162 |

FOREIGN PATENT DOCUMENTS 0002960  2/1978  Japan ........................... 426/11

Primary Examiner—Raymond N. Jones
Assistant Examiner—Marianne M. Cintins
Attorney, Agent, or Firm—Zarley, McKee, Thomte, Voorhees & Sease

[57] ABSTRACT

A method of making cereal wine includes mixing a ground cereal grain, sugar, amylase enzyme, yeast nutrient, wine tannin, and a sanitizing agent in water. After a time delay, started yeast is added to the mixed ingredients which are occasionally stirred as fermentation occurs. The solids portion of the mixed ingredients are allowed to settle to the bottom of a liquid portion which is drained off and stored in a separate tank. The wine is periodically racked and is deemed ready for bottling in approximately nine months.

18 Claims, 1 Drawing Sheet

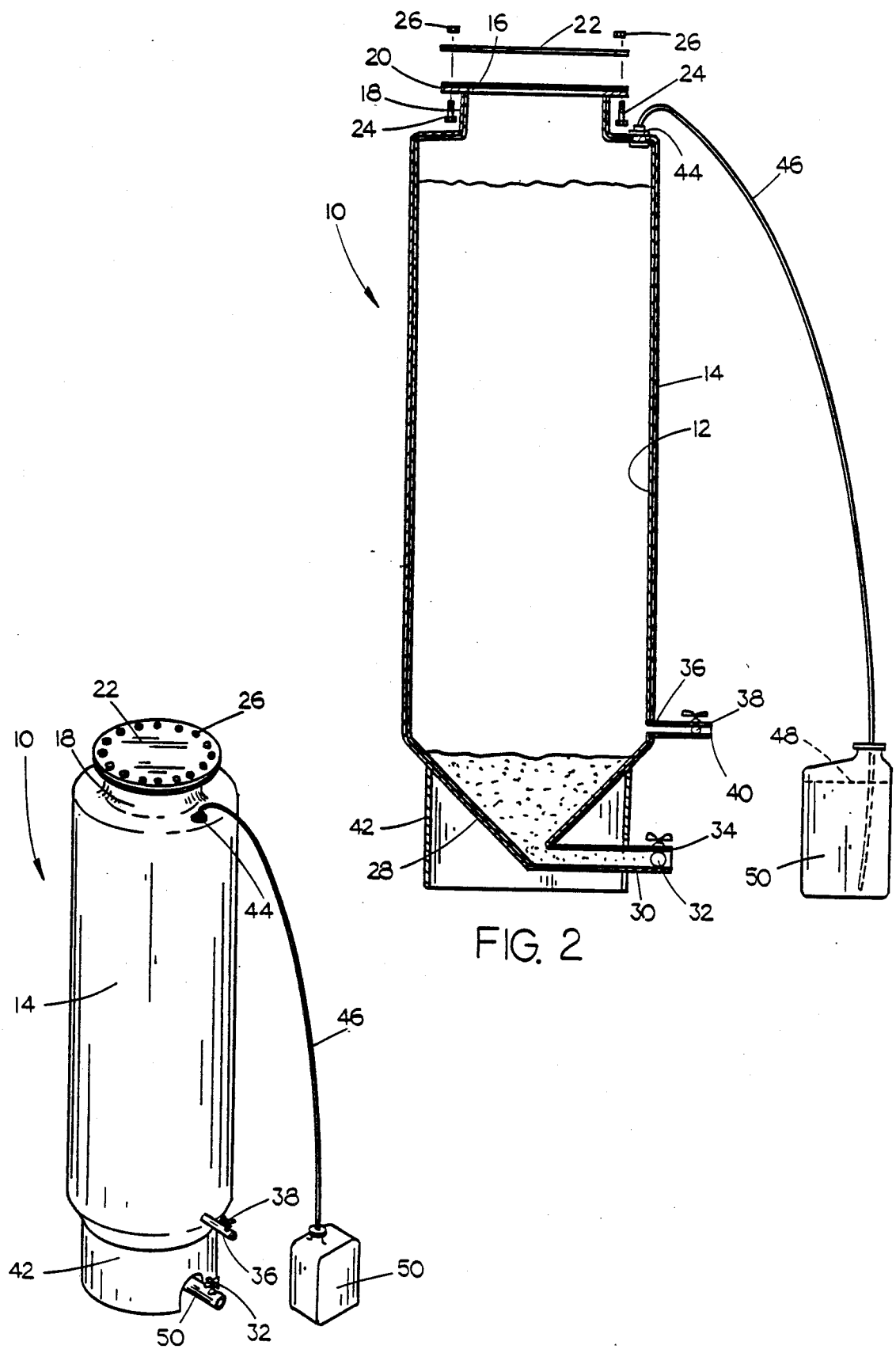

METHOD OF MAKING CEREAL WINE

CROSS REFERENCE TO RELATED APPLICATION

This is a continuation-in-part of U.S. patent application Ser. No. 808,547 filed on Dec. 13, 1985, now U.S. Pat. No. 4,675,192.

BACKGROUND OF THE INVENTION

The present invention is directed generally to a wine making process and more particularly to a method of making wine from cereal grains.

Traditionally, wine has most commonly been prepared from grapes. Other fruits and fruit juices have also previously been used as the basic material from which wine is made.

Cereal grains such as corn, wheat, rice and others can be used in the production of alcohol and starch as disclosed in Smith et al U.S. Pat. No. 3,236,740 and Yoshizumi et al U.S. Pat. No. 4,092,434. Grains are also used in the preparation of spirits such as whiskey or gin. It has not heretofore been known, however, that cereal grains may be used as the primary base material in the production of wine nor has any method been known for successfully making a cereal wine with a taste closely resembling the white wine produced from grapes.

SUMMARY OF THE INVENTION

The method of making cereal wine, according to the present invention, includes the steps of mixing ground cereal grain with slight amounts of amylase enzyme in a quantity of hot water. Other enzymes, such as pectic enzyme, may be added as a clarifier for the wine in the event that a mechanical clarifier is not available. After stirring the hot mixture for a period of approximately two hours, the must is cooled to prevent souring of the mash. After a time period of approximately twenty-four hours, the liquid is squeezed out from the grain and introduced into a second tank. Cold water is added to the squeezed grain in the first tank and allowed to stand for a time such as twenty-four hours. The liquid is squeezed out again and is added to the second tank. Any remaining liquid is saved for refilling the second tank after each racking.

The following ingredients are added to the liquid when it is first introduced into the second tank: started wine yeast, citric or tartic acid, wine tannin and yeast nutrient. Over a period of days, the mixture is stirred occasionally after which a solids portion of the mixed ingredients is allowed to settle to the bottom of the liquid portion thereof. At this stage, the wine is racked to separate the liquid portion from the solids portion. The racked wine is then stored for an extended period of time. During storage, small amounts of tannin, acid and sugar may be added to adjust the taste of the wine product and/or raise the alcohol content thereof.

Whereas the wineries that use fresh grapes can produce only a few months during the year, wineries that use cereal grains can produce all year. Furthermore, since grain prices are relatively very low, cereal wine can be produced considerably cheaper than grape wine. Furthermore, when the process is done, the ground grain that is left over, called "must", can be fed to livestock with the result that the base grain material can cost the winery little if anything. Certainly the value of a grain crop is substantially enhanced by using it for the production of wine.

BRIEF DESCRIPTION OF THE DRAWINGS

FIG. 1 is a perspective view of a tank adapted for small scale production of cereal wine; and FIG. 2 is an enlarged sectional view of the tank of FIG. 1.

DESCRIPTION OF THE PREFERRED EMBODIMENT

Whereas cereal wine can be made in quantities ranging from less than five gallons to batches of thousands of gallons, the method of making cereal wine according to the present invention is described herein in connection with two examples wherein an approximately 250 gallon batch of cereal wine is produced in each.

An apparatus in which this quantity of cereal wine can be made is shown in FIGS. 1 and 2 as including a double wall tank 10 having an inner wall 12, preferably of stainless steel or copper, and an outer wall 14 of fiberglass. The top of the tank has a large opening 16 defined by a raised neck portion 18 terminating in an outwardly directed annular flange 20. A round cover 22 is adapted to close and seal the opening 16 and a plurality of bolts 24 are insertable through registered holes in the flange 20 and cover 22 for securing the cover onto the flange with nuts 26. Opening 16 is large enough to facilitate access to the interior of the tank for cleaning it.

Tank 10 is basically cylindrical but includes a frusto-conical lower portion 28 which tapers downwardly toward the inner end of a solids discharge conduit 30 equipped with a shutoff valve 32 and outlet end 34.

When wine in the tank is racked, the liquid portion is drawn off through the liquid discharge conduit 36, also equipped with a shut-off valve 38 and having an outlet end 40. The tank is supported on a generally cylindrical stand 42.

A 1-inch diameter vent outlet 44 opens through an upper portion of the tank for venting gases through a ½-inch plastic hose 46, the lower end of which is immersed within water 48 in a separate receptacle 50 to bubble the gases given off from tank 10.

In the preferred embodiment, tank 10 is designed to have a capacity of 250 gallons. The solids discharge conduit 30 has a 2-inch diameter and the liquid discharge conduit 36 has a 1-inch diameter. Top opening 16 is 18-inches in diameter.

Whereas wine can be prepared from any of various cereal grains including wheat, corn, barley, rye, oats, rice and milo, wheat is used in the two examples disclosed herein. It is understood that any of the other cereal grains could be substituted for the wheat.

The first step for making wheat wine, according to the first example, is to fill a first tank 10 with the following ingredients, the indicated quantities corresponding to this specific example:

(1) 500 pounds ground wheat;
(2) 500 pounds sugar dissolved to bring the specific gravity to 1.110;
(3) ½ pound amylase enzyme;
(4) 2.7 pounds of yeast nutrient;
(5) 1 pound wine tannin;
(6) ½ pound pectic enzyme;
(7) 8 pounds tartic acid;
(8) 1 pound sanitizing agent such as sodium bisulfite; and
(9) water.

More wheat may be added for more body. Wine tannin is natural in grape wine but it has been found necessary to add wine tannin even in the production of grape wine in certain years. The amylase enzyme is used to break down starch in the wheat to sugar so it can become alcohol and the pectic enzyme is used to make the solids settle out, thereby producing a clearer wine.

A satisfactory wheat wine product is produced using the above-described amylase enzyme without any additional enzyme such as the pectic enzyme. Enzymes generally are added as a clarifier and it has been found that the wheat wine product will be satisfactorily clarified by the enzymes in approximately nine months to one year. Clarification can be substantially expedited with the use of a mechanical clarifier, therefore substantially reducing the necessary storage time prior to bottling. Such equipment may be unavailable to smaller producers, however, due to the expense thereof.

It is not critical that the acid be pectic acid. Ten pounds of a citric acid could be substituted, for example. The acid tends to give a sting to the tongue which is desirable for wine.

The sugar is first dissolved and added to the wine to be tested with a hydrometer to adjust the specific gravity to 1.1.

After the tank is filled with the above listed ingredients, about 50 gallons of juice are removed through outlet valve 38 to provide space within the tank. The ingredients are left in the tank for about 24 hours to give the sodium bisulfite time to work.

The sodium bisulfite operates to kill the natural yeast that is in the wheat since the inferior bacteria that would be produced thereby is undesirable. The sodium bisulfite is gone after about 24 hours. It is used again before the wine is finally bottled.

The next step is to add one pound of started yeast. The amount of yeast is not critical since it grows. A dry, live yeast is used and may be premixed with fruit juice to activate it.

In a 250 gallon tank, it takes about 36 hours for the fermentation to get wild. In the specific example described herein, the tank boiled over on the fourth day, losing 50 gallons of liquid. On the fifth day, 100 pounds of wheat and 100 pounds of dissolved sugar were added. On the seventh day, the 50 gallons of juice that had been removed from the tank were added back with one gallon of lemon juice. This filled the tank 10 to the neck 18.

On the eighth day, the tank was pumped for about 15 minutes to stir the ingredients. The wine may be stirred by drawing wine from the tank through the top vent outlet 44 and a suitable conduit to a liquid pump having its output connected to the discharge conduit 30. Alternatively, large winery tanks will generally be provided with a mechanical mixer or agitator for the solids in the tank. On the ninth day, the liquid was again pumped for about 15 minutes.

On the tenth day, the ingredients were separated by pumping the liquid out the upper discharge conduit 36 and into a second tank 10. The remaining solids or "must" in the bottom of the tank were discharged through the lower conduit 30 and were used as feed for pigs. About three gallons of brown thick solids were removed.

To adjust the specific gravity of the saved liquid, 50 pounds of sugar were added together with one quart of lemon juice for acid.

One month later, the wine was racked, i.e. the liquid was drained off through conduit 36 to another clean tank, with the solids being drained off through conduit 30 for discharge or use as additional livestock feed. At this stage the wine tasted flat and acid was ordered.

One month later, the wine was again racked and the following ingredients were added: 1 pound enzymes, ½ pound tannin and 8 pounds tartic acid.

One month later, the wine was again racked. The wine was sampled and tasted back to normal. About one teaspoon of pineapple flavoring and one cup of sugar per gallon of wine were added. About four gallons of the wine were removed for others to sample. The pineapple flavoring was added to hide the smell of the yeast remaining in the wine. After storing the wine for an additional two months, the yeast and associated smell were substantially gone with the result that pineapple flavoring, for example, was no longer needed.

After the third month, the wine was racked every two months. For each time the wine is racked, the tank is cleaned by adding sodium bisulfite or a similar sanitizing agent. About nine months after the process was started, the wine was deemed ready for bottling. The resulting product was a slightly sweet white wine having a taste which was reported to make one think of a cluster of ripe dew-covered grapes.

Whereas the wheat wine that is produced is somewhat dry, a semi-sweet wine may be made by adding a cup of dissolved sugar per gallon of wine. More sugar can be added for a sweeter wine. Champagne may be produced by adding yeast powder when bottling the wheat wine.

Whereas the method of making wheat wine has been described in connection with this first example, it is apparent that any modifications, additions and substitutions may be made which are within the intended broad scope of the invention. For example, the quantity of the various ingredients may be varied within the following approximate ranges: 1 to 4 pounds of wheat per gallon of water; 1 to 4 pounds of sugar per gallon of water; 6–12 pounds of acid per 250 gallons of water and ½ to 1½ pounds live yeast per 250 gallons of water. The quantity of amylase enzyme, tannin, pectic enzyme and sodium bisulfite may also be varied within the range of approximately plus or minus 40 percent.

In the second example, the following ingredients were mixed in a first tank 10 in the indicated quantities:
(1) 650 pounds finely triple ground wheat;
(2) 7 ounces alfa amylase enzyme;
(3) 7 ounces glucoamylase enzyme;
(4) 10 ounces pectic enzyme;
(5) 3 ounces sodium bisulfite; and
(6) 150 gallons of hot water at approximately 105° F.

The mixture was stirred every few minutes for two hours. At that time, the specific gravity was checked and found to be 1.040. Eighty gallons of cold water was then added to cool the must so as not to let the mash sour. If alternate cooling methods are available such as refrigeration, the entire quantity of water may be added at the outset.

The cooled must was allowed to stand for twenty-four hours, after which the specific gravity was again checked and found to be 1.080. This equates to an alcohol content of 10.94 percent. It is significant that no sugar has been added to the mixture so it is clear that the alcohol content had been produced soley by transformation of starches in the wheat grain.

The next step involved squeezing out the liquid from the mixture and placing the liquid in a second tank like that indicated in the drawing at 10. Forty gallons of cold water were added to the squeezed grain which was stirred and allowed to stand for twenty-four hours. The liquid was again squeezed out from the grain and was used to finish filling the second tank. The specific gravity of the second batch of squeezed liquid was 1.030. The leftover liquid was saved for refilling the second tank after the first racking in approximately fifteen days.

The following ingredients were added to the liquid in the second tank after the first squeezing:
(1) 8.5 ounces of started wine yeast;
(2) 5.5 pounds of citric acid (tartic acid could be used as an alternate);
(3) 1.5 ounces wine tannin;
(4) 4 ounces yeast nutrient.

The remaining steps are similar to those described in connection with the first example, namely pumping or mixing the ingredients in the second tank at least a couple of times during the first ten days and then racking the wine of the tenth day and monthly for the next two mounths and bi-monthly thereafter to a time approximately nine months after the process was started. At that point, the wine is generally ready for bottling.

It is preferable that the alcohol content of the finished wine be approximately 14 percent so that the wine will keep for a year or more. Lower alcohol contents are indicative of other types of refreshment such as a wine cooler which may be flavored with fruit or the like. It is furthermore preferred that at least 51 percent of the alcohol in the finished wine product is from the ground cereal grain. Different batches of even of the same type of cereal grain can have different starch contents so as to result in the production of wine having different percentages of alcohol. Accordingly, one can add dissolved sugar when racking the second time to raise the alcohol content to the desired level. Generally, the addition of approximately one-tenth of a pound of sugar per gallon of liquid wine product will raise the alcohol content by about one percent.

It is understood that the quantities for the ingredients specified in the second example are not critical to the invention but rather may be varied within certain ranges. For example, the amount of ground grain to be added to 250 gallons of water should be between 300 and 700 pounds with approximately 600 pounds being preferred. More than about 700 pounds grain will not liquify in 250 gallons of water. The lower limit is selected so that at least 51 percent of the alcohol content of the wine product will be from the grain. Likewise, the quantity of amylase enzyme should be between 3 and 24 ounces with 3 to 10 ounces being preferred. Enzymes can create an odor if too much is used and any amount beyond that which is necessary is simply a waste of money and time. No pectic enzymes are needed if a mechanical clarifying process is used such as a centrifuge.

Other ingredients may be varied as well. The quantity of sanitizing agent or sodium bisulfite should be between 2 ounces and one pound with 2 to 10 ounces preferred. It creates an odor during the first twenty-four hours but disappears in time. The upper limit is specified since the sodium bisulfite can be toxic and possibly make one sick if used in excess. For later stages of the method, different and more effective sanitizing agents may be preferred.

The quantity of wine yeast should be a trace and 2 pounds with between ½ pound and 1½ pounds being preferred. Since the yeast doubles itself approximately every three minutes, a very small quantity would suffice but it is preferred to begin with a sufficient quantity to save time. Too much yeast will cause boil-over. It is desirable to take it easy and minimize foaming action during the wine making process.

Between a trace and 8 ounces of wine tannin is specified with zero to 5 ounces being preferred. The specific amount depends on the type of wine being made. The tannin is added to effect the desired flavor for the wine product.

Yeast nutrient is specified as being between a trace and one pound. Some yeast nutrient is necessary since the yeast needs more than sugar alone to be activated and live. Excess amounts simply end up in the bottom of the tank, however, and waste money.

The acid quantity is specified as being between 2 and 15 pounds to afford variance according to desired tastes of the finished wine product.

Ranges of proportions for the ingredients are specified to accommodate different tastes and processes. Generally, higher proportions of wheat produce a wine with more body. More sugar will generally result in the production of more alcohol except in certain processes where the wine is "killed" by the addition of a sanitizing agent such as sodium bisulfite or potassium sorbate so that the remaining sugar will contribute to the sweetness of the wine product.

Thus there has been shown and described a method of making wheat wine which accomplishes at least all of the stated objects.

I claim:

1. A method of making wine from cereal grain, comprising, providing the following ingredients: cereal grain, amylase enzyme, yeast nutrient, wine tannin, acid, wine yeast and water, mixing the cereal grain with said amylase enzyme and water, further mixing the yeast nutrient, wine tannin and acid with said cereal grain, amylase enzyme and water, adding the wine yeast to the cereal grain, amylase enzyme and water, said ingredients being added in a ratio of the following quantities per 250 gallons of water:
 cereal grain—between 300 and 700 pounds;
 amylase enzyme≤between 3 and 24 ounces;
 yeast nutrient—between a trace and 1 pound;
 wine tannin—between a trace and 8 ounces;
 sanitizing agent—between 2 ounces and 1 pound;
 an acid selected from the group consisting of citric acid and tartic acid—between 2 and 15 pounds; and
 wine yeast—between a trace and 2 pounds, allowing a solids portion of the ingredients mixed in the mixing step, further mixing step and adding step to settle to the bottom of a liquid wine portion thereof, separating the liquid wine portion from the solids portion, and storing the separated liquid wine portion.

2. The method of claim 1 wherein the step of providing amylase enzyme comprises providing both alfa amylase enzyme and glucoamylase enzyme.

3. The method of claim 1 wherein said mixing steps further comprise providing pectic enzyme as a clarifying agent.

4. The method of claim 1 wherein said mixing step includes adding amylase enzyme in a porportion of approximately one pound amylase enzyme per 250 gallons of water.

5. The method of claim 1 wherein said cereal grain and enzyme are first mixed with hot water at approximately 105° F.

6. The method of claim 5 further comprising periodically stirring the mixed cereal grain, enzyme and hot water and then cooling the mixture.

7. The method of claim 6 wherein cooling the mixture comprises adding cold water.

8. The method of claim 1 further comprising, after said mixing step and before said further mixing step, compressing the mixture of cereal grain, enzyme and water to remove liquid from the compressed mixture, removing the liquid and storing the removed liquid.

9. The method of claim 8 further comprising adding water to the compressed mixture, stirring the added water and compressed mixture, and then recompressing the mixture, at least ten hours after adding water to the compressed mixture, to remove further liquid therefrom, removing the further liquid and adding said further liquid to the stored removed liquid.

10. The method of claim 8 wherein said allowing step takes between 10 and 20 days.

11. The method of claim 10 wherein said delaying steps comprises delaying approximately 24 hours.

12. The method of claim 1 wherein said mixing step includes mixing between 1 and 6 pounds of cereal grain per gallon of water.

13. The method of claim 1 further comprising providing a mixing tank including an outlet adjacent an upper end thereof, a separate liquid receptacle and a conduit having one end in fluid communication with said outlet and an opposite end submersed in liquid in said receptacle.

14. The method of claim 1 further comprising periodically racking the liquid wine portion and saving the racked liquid wine product.

15. The method of claim 14 further comprising adding sugar to the wine product to adjust the taste thereof.

16. The method of claim 1 wherein said mixing step further comprises mixing the sanitizing agent with the cereal grain, enzyme and water.

17. The method of claim 16 wherein said step of adding the wine yeast is performed approximately twenty-four hours after adding the sanitizing agent in the mixing step.

18. The method of claim 17 wherein said sanitizing agent comprises sodium bisulfite.

* * * * *